July 14, 1964 — M. ANTICI — 3,140,881
TRAILER HITCH
Filed March 27, 1962 — 2 Sheets-Sheet 1
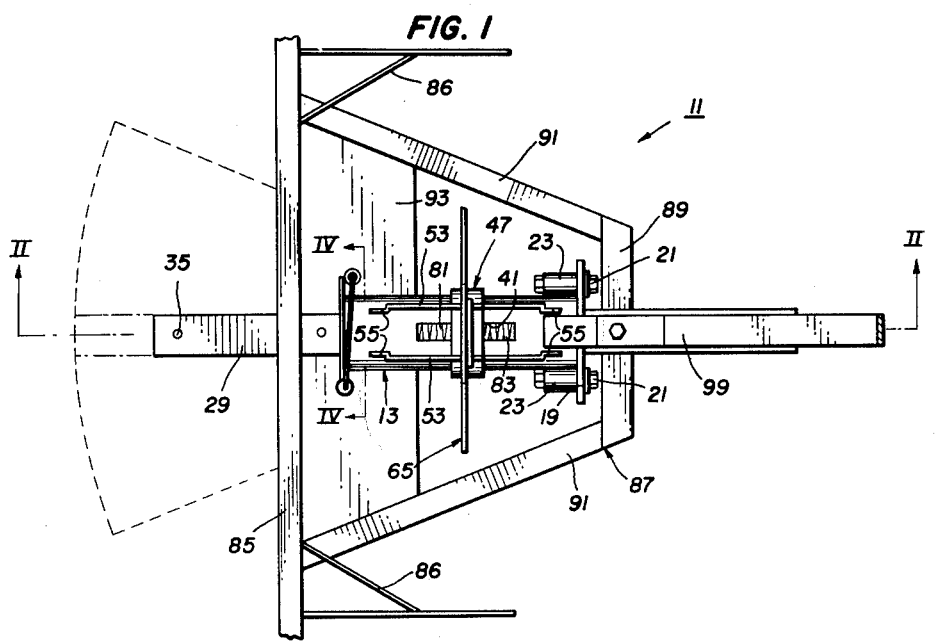
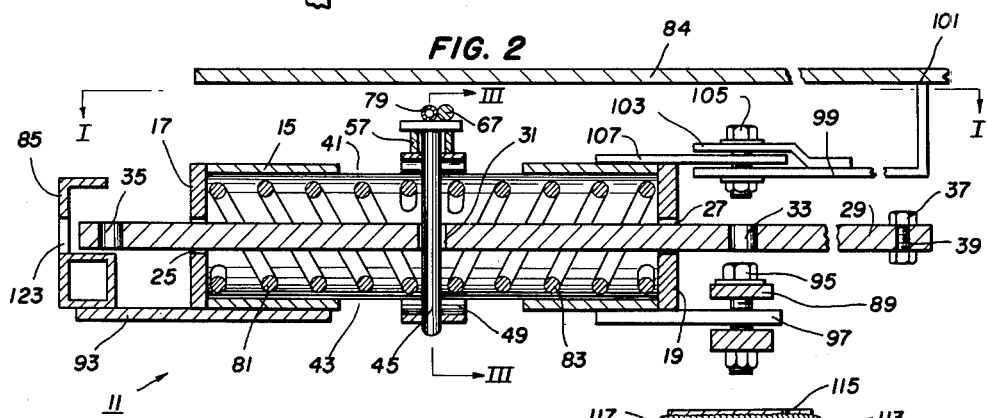
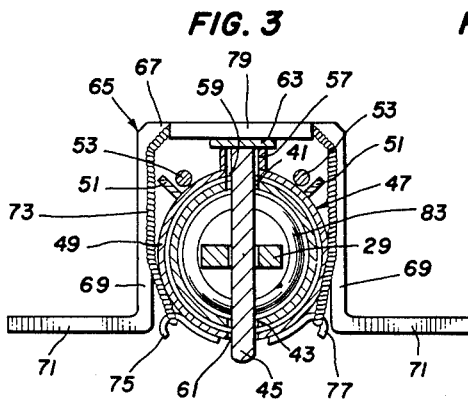
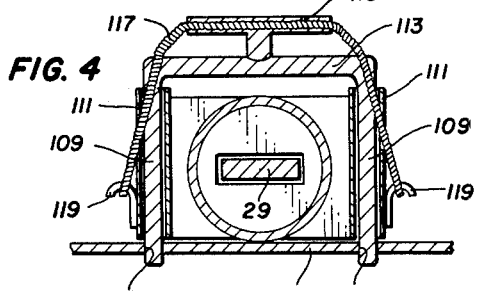
INVENTOR.
MARINO ANTICI
BY John R. Walker, III
Attorney

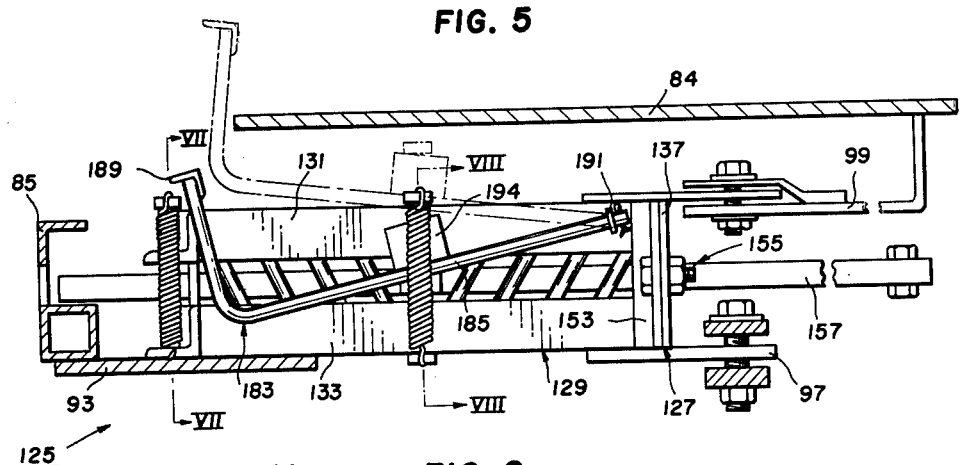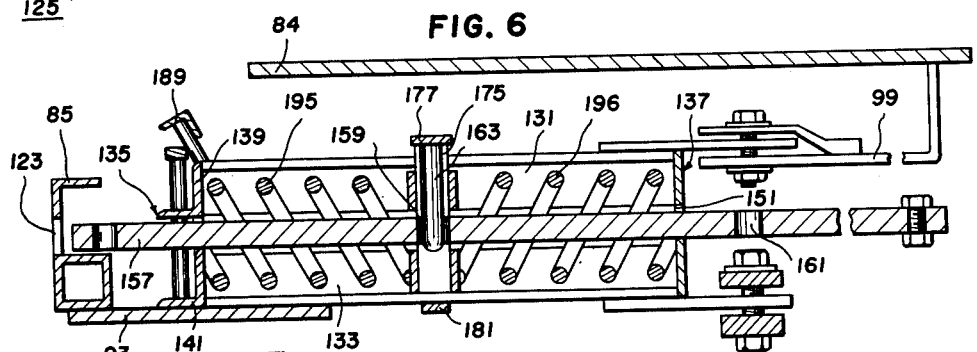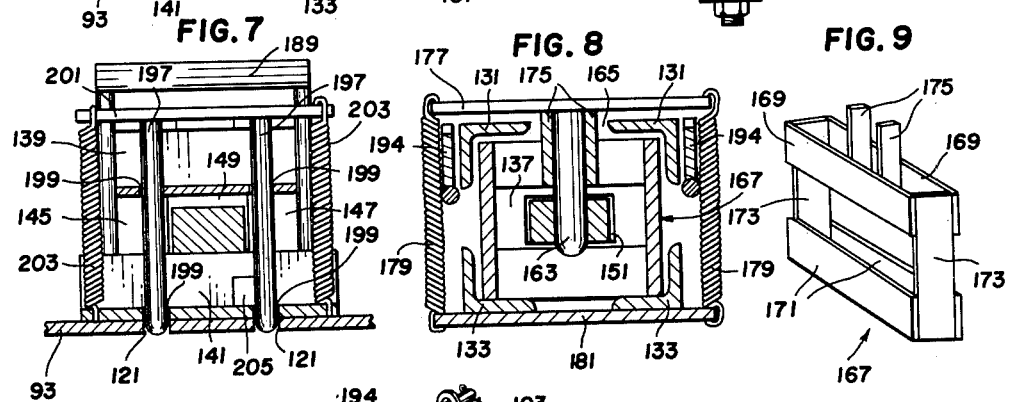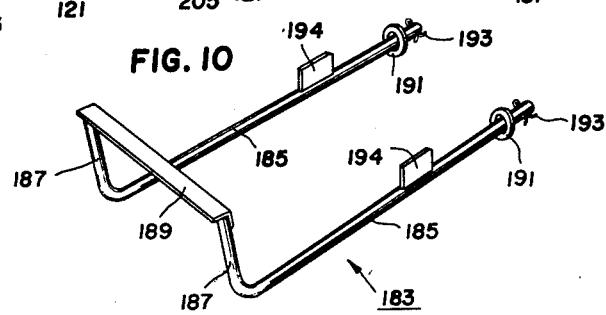

3,140,881
TRAILER HITCH
Marino Antici, 1404 Rose Circle, Clarksdale, Miss.
Filed Mar. 27, 1962, Ser. No. 182,732
9 Claims. (Cl. 280—478)

This invention relates to an improved trailer hitch for vehicles and the like, and more particularly relates to a coupling or hitch adapted to connect a trailer or the like to a vehicle for the towing of the trailer. This is a continuation-in-part of my co-pending application Serial No. 99,876, filed March 31, 1961, now abandoned.

As is known by those familiar with trailer hitches, one of the problems involved in attaching the trailer to the hitch is getting the trailer and the vehicle maneuvered into such a position that the hitch can be coupled to the trailer. This usually involves backing the vehicle into the general vicinity of the trailer and then pulling the trailer around into an exact position of alignment with the hitch, which is both troublesome and time consuming.

The present invention is directed towards overcoming the above mentioned and other problems commonly encountered with trailer hitches.

Thus, one of the objects of the present invention is to provide a trailer hitch including a draw bar that is arranged so that it can be disengaged from a latched position for free movement to cover an infinite number of positions within a wide area, whereby the end thereof can be brought into engagement with the trailer when the trailer is in said area and without having to move the vehicle.

A further object is to provide such a trailer hitch having shock absorber means and unique means for connecting the draw bar thereto, so that the draw bar can be selectively manually disconnected from the shock absorber means to permit free movement thereof for connecting the draw bar to the trailer and is arranged so that the draw bar will automatically re-engage with the shock absorber means during the towing of the trailer.

A further object is to provide such a trailer hitch having unique means for selectively permitting swing of the draw bar or for locking it in a set position.

A further object is to provide such a trailer hitch which is adapted to be mounted beneath the rearward portion of a vehicle with the draw bar extending through a slot in the rear bumper of the vehicle and arranged so that the draw bar when not in use is adapted to be moved to a housed position inside the bounds of the bumper.

A further object is to provide such a trailer hitch provided with a unique lever arrangement for ease of performing the unlatching operation.

A further object is generally to improve the design and construction of trailer hitches.

The means by which the foregoing and other objects of the present invention are accomplished and the manner of their accomplishment will be readily understood from the following specification upon reference to the accompanying drawing, in which:

FIG. 1 is a fragmentary plan view of the device of the present invention, taken as on the line I—I of FIG. 2.

FIG. 2 is an enlarged fragmentary sectional view taken as on the line II—II of FIG. 1.

FIG. 3 is a sectional view taken as on the line III—III of FIG. 2.

FIG. 4 is an enlarged sectional view taken as on the line IV—IV of FIG. 1.

FIG. 5 is a view similar to FIG. 2 of an alternate form of the present invention, but showing parts of the alternate form in elevation for purposes of illustration.

FIG. 6 is a view similar to FIG. 2 of the alternate form of the present invention.

FIG. 7 is a sectional view on an enlarged scale taken as on the line VII—VII of FIG. 5.

FIG. 8 is an enlarged sectional view taken as on the line VIII—VIII of FIG. 5.

FIG. 9 is a perspective view of the carrier of the alternate form of the present invention.

FIG. 10 is a perspective view of the lever of the alternate form of the present invention.

Referring now to the drawings in which the various parts are indicated by numerals, the trailer hitch 11 of the present invention comprises an elongated and generally horizontally extending hollow casing 13, which includes a cylindrical body portion 15 having an end piece 17 fixedly attached to the rearward end of the body portion to close off the rearward end thereof. An end piece 19 is preferably removably attached to the forward end of body portion 15 to close off the forward end thereof. As best seen in FIG. 1, end piece 19 is preferably removably attached as by bolt means 21 which extend through apertures in the end piece and through sleeves 23 that are fixedly attached to body portion 15, as by welding or the like. End pieces 17, 19 respectively are provided with openings 25, 27 therethrough.

An elongated draw bar 29 extends centrally through casing 13 and projects slidably outwardly in opposite directions through openings 25, 27. Draw bar 29 is provided with a pair of spaced holes 31, 33 intermediate the ends thereof, for a purpose later to be described. In addition, another hole 35 is provided through draw bar 29 adjacent the rearward end thereof to provide means for attaching the trailer thereto. Draw bar 29 is limited in its rearward movement to the position shown in broken lines in FIG. 1, as by bolt means 37 extending through an additional hole 39 in draw bar 29 adjacent the forward end thereof. Thus, it will be seen that bolt means 37 engages end piece 19 to limit the rearward movement of the draw bar, as above described. Body portion 15 is provided with a pair of diametric elongated slots 41, 43. Slots 41, 43 extend longitudinally of body portion 15, with slot 41 being adjacent the upper portion of body portion 15, and with slot 43 being adjacent the lower portion thereof and in vertical alignment with the slot 41.

A vertical pin 45 extends down through slot 41, through hole 31, and through slot 43, when draw bar 29 is in a housed position as shown in FIG. 2.

A carrier 47 includes a collar 49 which encircles body portion 15 with the body portion extending through the collar so that the collar is movable longitudinally relative to body portion 15. A pair of ears 51 are fixedly mounted on carrier 47 and project radially outwardly therefrom, and are adapted to respectively engage a pair of rods 53 to limit rotation of collar 49 relative to body portion 15. Rods 53 are respectively in spaced parallel relationship to body portion 15 and fixedly mounted therefrom as by having inwardly bent portions 55 of the rods adjacent the opposite ends thereof fixedly attached to the body portion as by welding or the like. Carrier 47 additionally includes a cylindrical neck portion 57 fixedly attached to collar 49 and upstanding therefrom. Neck portion 57 surrounds an aperture 59 in collar 49. Another aperture 61 is provided in collar 49 adjacent the lower portion thereof and in alignment with aperture 59. When in the housed position of draw bar 29, as shown in FIG. 2, in addition to extending through hole 31 and slots 41, 43 as heretofore described, pin 45 extends through apertures 59, 61. Pin 45 is provided with a head 63 at the upper end thereof which extends over neck portion 57 and removably rests thereupon when the pin is in the position best seen in FIGS. 2 and 3.

A handle 65 is fixedly attached to head 63 for lifting pin 45 in a manner later to be described. Handle 65 is preferably formed from a rod in the shape best seen in FIG. 3 wherein it will be seen the handle extends horizontally in the mid-portion 67 thereof, thence downwardly on opposite ends of the mid-portion as at portions 69, and thence outwardly in opposite directions as at portions 71.

Resilient means is provided for urging pin 45 downwardly, and preferably comprises a spring 73 attached adjacent opposite ends to hooks 75, 77 which in turn are attached to collar 49. Spring 73 extends through a sleeve 79 which in turn is fixedly attached to head 63 to transmit the force of spring 73 to the pin 45.

A pair of springs 81, 83 are disposed in casing 13 with spring 81 extending from end piece 17 forwardly and with spring 83 extending from end piece 19 rearwardly. The adjacent ends of springs 81, 83 are spaced apart so that pin 45 is adapted to be inserted therebetween. In FIG. 2 the springs 81, 83 are shown in the at rest position, and it will be understood that spring 83 acts as a shock absorber when the draw bar is urged forwardly and spring 81 acts as a shock absorber when the draw bar is urged rearwardly. In addition, it will be understood that this forward and rearward motion is possible since pin 45 can move forwardly and rearwardly in slots 41, 43 to carry with it carrier 47 which slides longitudinally on casing 13 and is prevented from turning thereon by rods 53.

Trailer hitch 11 is adapted to be mounted beneath the lower part of a vehicle, as for example, beneath the bed 84 of a truck or the like, whose rear bumper is shown as at 85 and which bumper is supported by the usual supports 86 connected to the other parts of the vehicle, not shown. The means for attaching trailer hitch 11 to the vehicle is preferably by a supporting framework 87, which comprises a transverse member 89 and a pair of side members 91 fixedly attached adjacent the opposite ends of transverse member 89 and extending rearwardly in diverging relationship therefrom to their points of attachment with bumper 85. Supporting framework 87 additionally includes a horizontal plate 93 rigidly attached to side members 91 and extending therebetween adjacent and attached to bumper 85. Plate 93 extends below the rearward end of casing 13 for a purpose later to be described. Casing 13 is swingably mounted from transverse member 89 as by means of a bolt means 95 extending through an aperture in transverse member 89 and through an aperture in a piece 97, which piece is in turn fixedly attached to casing 13 as by welding or the like. Thus, it will be understood, the casing 13 is swingably mounted about a vertical axis at bolt 95 to swing in a substantially horizontal plane to carry the rearward end of draw bar 29 in an arc. A suitable support 99 is preferably provided between bed 84 and casing 13, and preferably is fixedly mounted as at 101 to the bed and extends downwardly and rearwardly therefrom to a bifurcated end portion as at 103 where it is pivotally attached as by a bolt 105 to a piece 107 that in turn is fixedly attached to the casing. It will be understood that the bolt extends through aligned apertures in bifurcated end 103 and piece 107.

A pair of vertical locking pins 109 respectively slidably extend through a pair of upstanding sleeves 111 that are fixedly attached to end piece 19 adjacent opposite sides thereof. Locking pins 109 are interconnected adjacent the upper ends thereof by a preferably integrally formed transverse rod 113. A handgrip 115 is fixedly attached to transverse rod 113 for manually lifting pins 109 upwardly for a purpose later to be described. Elastic means is provided for urging locking pins 109 downwardly and preferably includes a spring 117 loosely extending through the handgrip 115, the upper part of which is preferably in the form of a pipe. The ends of spring 117 are preferably respectively attached to sleeves 111 as by means of hooks 119 which are fixedly attached to the sleeves and which engage the ends of the spring.

Plate 93 is provided with a pair of spaced apertures 121 which are adapted to respectively receive pins 109 to lock the casing 13 in a center or longitudinal position relative to framework 87 and relative to the truck, not shown.

Bumper 85 is provided with a slot 123 therethrough and through which draw bar 29 is adapted to extend. The slot 123 is of sufficient length to permit swing through a substantial arc (as shown by the dotted lines in FIG. 1) of draw bar 29 with the draw bar extending through the slot.

Assuming that trailer hitch 11 is in the housed position, in using the trailer hitch the operator reaches beneath truck bed 84 and pulls upwardly on handle 65 to withdraw pin 45 from hole 31, and while the pin is withdrawn the draw bar 29 is moved rearwardly to the desired rearward position. Then, to swing draw bar 29 to the desired lateral position, it will be understood that the operator merely pulls upward on handgrip 115 to withdraw locking pins 109 from apertures 121 so that the casing 13 and the draw bar 29 are free to swing. With locking pins 109 and pin 45 withdrawn as above described, it will be understood that the rearward end of draw bar 29 may be placed anywhere desired within the working area which is rearward of bumper 85 and bounded by the dashed line arc shown in FIG. 1. It is only necessary to back the vehicle up to the general vicinity of the trailer tongue and then by maneuvering the draw bar 29 as above described it can be brought into alignment with the trailer tongue and hitched thereto without any difficulty and very quickly.

From the foregoing it will be understood that when hand-grip 115 is released, locking pins 109 will engage the upper surface of horizontal plate 93 and will slide thereon to permit the draw bar 29 to swing as hereinabove described. Additionally, it will be understood that when handle 65 is released, pin 45 will be urged against the upper surface of draw bar 29 so that the drawbar can slide relative thereto, as above described.

After draw bar 29 has been connected to the trailer tongue, not shown, the vehicle is driven off to tow the trailer, and the trailer hitch 11 will become automatically engaged in the towing position which is shown in solid lines in FIG. 1. It will be understood that this engagement will take place to center the trailer hitch when the draw bar 29 and casing 13 swings back into a center position relative to the vehicle since locking pins 109, which have been sliding on plate 93 as above described, enter the apertures 121. This will occur when the vehicle and the trailer are in substantial fore and aft alignment. Also, it will be understood that the pin 45 will enter hole 33 to lock the draw bar 29 lengthwise in said towing position when the vehicle slows down, as when changing gears, or when the vehicle comes to a stop.

Referring now to the alternate form of the present invention shown in FIGS. 5–10, the trailer hitch 125 of the alternate form comprises an elongated and generally horizontally extending rigid and hollow casing 127 which includes a body portion 129, preferably formed of four spaced angle members adjacent the corners thereof, that is, a pair of horizontally extending and spaced angle members 131 and a pair of spaced lower angle members 133. In other words, angle members 131 and 133 extend in parallel relationship longitudinally of the device and face inwardly. Casing 127 additionally includes ends 135 and 137 at the opposite ends of body portion 129 to hold the angle members 131, 133 in fixed relationship to establish the rigid casing. Rearward end 135 is preferably formed of a pair of transverse angle members 139, 141 which are respectively fixedly attached to the rearward ends of upper angle members 131 and lower angle members 133. Angle members 139, 141 are spaced apart and a pair of laterally spaced plates 145, 147 fixedly interconnect the angle members 139, 141 and establish with the angle members 139, 141 an opening 149. Forward end 137 is preferably removably attached to the forward end of body portion 129 to close off the forward end thereof, and an opening 151 substantially in alignment with opening 149 is provided through end 137. The means for removable attaching end 137 is preferably by a pair of angle members 153 fixedly attached on opposite sides of casing 127 and by bolt means 155 which extend through apertures in the end 137 and angle members 153.

An elongated draw bar 157, substantially like draw bar 29, extends centrally through casing 127 and projects slidably outwardly in opposite directions through openings 149, 151. Draw bar 157 is provided with a pair of spaced holes 159, 161 as in the principal embodiment and is otherwise constructed in the same manner.

A vertical pin 163, corresponding to pin 45, extends down through the space or slot 165 formed between angle members 131 and is movably supported by a carrier 167 which is slidably mounted on the interior of casing 127 for forward and rearward movement and is arranged to permit pin 163 to move vertically. Carrier 167 comprises spaced transversely extending upper members 169 rigidly interconnected to spaced transversely extending lower members 171 by transversely spaced upstanding members 173. A pair of transversely spaced upstanding pieces 175 are fixedly attached between upper members 169 and extend thereabove. When carrier 167 is in assembled relationship with casing 127, the carrier slidably rests on angle members 133, and it will be understood that the carrier is permitted to move forwardly and rearwardly, but is limited against any substantial upward, downward, sidewise or twisting movement by the angle members 131, 133. Pin 163 is provided with a transversely elongated head 177 which projects outwardly beyond opposite sides of the casing, as best seen in FIG. 8. Pin 163 extends downwardly between upstanding pieces 175 and when draw bar 157 is in the housed position, as best seen in FIGS. 5 and 6, the lower end of the pin additionally extends through hole 159 where the pin is limited in its downward movement by contact of head 177 with the upper end of pieces 175. Pin 163 is urged downwardly by means of a pair of springs 179 which are attached adjacent the upper ends thereof to the opposite ends of head 177 and attached adjacent the lower ends thereof to casing 127 by means of a transverse member 181 fixedly attached to the bottom of the casing and extending outwardly beyond the sides thereof beneath head 177. It will be understood that head 177 can be grasped to withdraw the pin 163 upwardly, as in the principal embodiment. However, the following arrangement is preferably provided for making the withdrawal of the pin easier. This arrangement includes a lever 183, best seen in FIG. 10, which includes a pair of spaced elongated legs 185 which are bent upwardly as at 187 adjacent the rearward ends thereof with the distal ends being rigidly interconnected by means of a transverse piece 189. Lever 183 straddles casing 127 and is pivotally attached thereto as by means of rings 191 which are fixedly attached, as by welding, adjacent opposite sides of the casing and through which loosely extend the forward ends of legs 185. Cotter keys 193 extend through bores in the rearward ends of legs 185 to prevent lever 183 from separating from the casing. Legs 185 are provided with a pair of upwardly extending projections 194 intermediate the ends of the legs. Legs 185 extend from their points of pivotal attachment with the casing, as heretofore described, rearwardly and downwardly towards the rearward end of the trailer hitch 125 and thence extend upwardly as at 187 so that transverse piece 189 is located adjacent the rearward end of the trailer hitch, where it is easily accessible and may be pulled upwardly into raised positions, one of which is illustrated in broken lines in FIG. 5. Upward pull, as above described, on lever 183 causes projections 194 to contact opposite ends of head 177 and to lift the head and pin 163 so that the pin may be withdrawn from the holes 159, 161 in draw bar 157, whereby the trailer hitch 125 is operable in a similar manner to that heretofore described for the principal embodiment.

A pair of springs 195, 196, corresponding to springs 81, 83, respectively extend between rearward end 135 and carrier 167, and between forward end 137 and carrier 167. Springs 195, 196 are preferably under a slight amount of compression to prevent rattling of the parts.

Trailer hitch 125 is adapted to be mounted beneath the lower part of a vehicle in the same manner as the principal embodiment, and the mounting means, parts of the vehicle, bumper, etc. have been designated by the same numerals as used to describe the principal embodiment.

Trailer hitch 125 is provided with a pair of vertical locking pins 197, corresponding to locking pins 109 of the principal embodiment, which respectively slidably extend through aligned apertures 199 in angle members 139, 141. Locking pins 197 are interconnected adjacent the upper ends thereof by a transverse rod 201, which serves as a handgrip for manually lifting pins 197. Elastic means is provided for urging locking pins 197 downwardly and preferably includes springs 203 respectively attached adjacent the upper ends thereof to opposite ends of transverse rod 201 and respectively attached adjacent the lower ends thereof to opposite ends of the angle member 141. A stop 205 is fixedly attached to one of pins 197 and adapted to engage angle member 141 to limit downward movement of pins 197.

The general overall operation of trailer hitch 125 is substantially the same as the operation of the trailer hitch 11 and, therefore, it is not deemed necessary to repeat same. However, it should be pointed out that in the trailer hitch 125, transverse rod 201 and transverse piece 189 are adjacent one another for convenience and both are rearwardly of bed 84 so that they are easily accessible and there is no necessity for reaching under the bed to withdraw vertical pin 163. In addition, it should be pointed out that release of lever 183 from its upward position will cause the lever to return to a downward position, shown in FIG. 5, under the influence of gravity.

From the foregoing description it will be understood that a very unique trailer hitch is provided that includes a draw bar which is so arranged that it can be disengaged from a latched position to cover an infinite number of positions within a wide area, whereby the end thereof can be brought into engagement with a trailer when the trailer is in said area and without having to move the trailer. In addition, it will be understood that such a trailer hitch is provided which automatically engages the shock absorber means during the towing of the trailer, and which automatically engages the casing in a towing position during towing of the trailer.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:
1. A trailer hitch for vehicles comprising a casing including a body portion and a pair of end pieces fixedly attached to said body portion adjacent the opposite ends thereof, said end pieces being provided with aligned openings therethrough, a draw bar slidably extending through said casing and projecting outwardly in opposite directions through said openings, said draw bar having a pair of spaced holes intermediate the ends thereof, said body portion being provided with diametric elongated slots therethrough, a pin, yieldable means urging said pin towards a latched position relative to said draw bar, when in said latched position said pin removably extending through said slots and through at least one of said holes to latch said draw bar, when said pin extends through one of said holes said draw bar being held in a retracted position and when said pin extends through the other of said holes said draw bar being held in an extended position, carrier means supporting said pin from said casing for movement of said pin lengthwise in said slots and for movement of said pin substantially perpendicular to said draw bar, a first resilient means in said casing on one side of said pin to act as a shock absorber in one direction and a second resilient means in said casing on the opposite side of said pin to act as a shock absorber in the opposite direction, handle means attached to said pin for withdrawing said pin against the force of said yieldable means from said latched position to an unlatched position in which said pin is withdrawn from one of said slots and from said holes to a position outside of said draw bar so that said draw bar is free to be moved between said retracted and extended positions and outwardly beyond said extended position to further extended positions, when said handle means is released said yieldable means urging said pin against said draw bar so that when said draw bar is moved to align one of said holes with said pin said pin automatically latches said draw bar, means attached to said casing for swingably mounting said casing from a vehicle for movement in a substantially horizontal plane so that said draw bar can be swung therewith in a substantially horizontal arc, a substantially horizontal plate supported beneath said casing adjacent one end thereof, said plate being provided with at least one aperture therethrough, at least one locking pin, means supporting said locking pin from said casing for vertical movement between a locked position and an unlocked position, when in said locked position said locking pin removably extending into said aperture to lock said casing against swinging movement relative to said plate, when in said unlocked position said locking pin being withdrawn from said aperture so that said casing and said draw bar are free to swing horizontally, elastic means attached to said locking pin to urge said locking pin towards said locked position, grip means attached to said locking pin for withdrawing said locking pin against the force of said elastic means from said locked position to said unlocked position, when said grip means is released said elastic means urging said locking pin against said plate so that when said casing and said draw bar are swung to align said locking pin with said aperture said locking pin automatically locks said casing and said draw bar against swinging movement.

2. The structure according to claim 1 in which at least one rod is mounted on said body portion and extending longitudinally thereof, and at least one ear means is mounted on said carrier means for engaging said rod to prevent turning of said carrier means.

3. A trailer hitch for vehicles comprising a casing including opposite ends, said casing being provided with aligned openings in said ends, a draw bar slidably extending through said openings in said casing, said draw bar having at least one hole therein, said casing having at least one elongated slot therethrough, a pin, yieldable means urging said pin towards a latched position relative to said draw bar, when in said latched position said pin removably extending through said slot and through said hole to latch said draw bar, when said pin extends through said hole said draw bar being held in an extended position, a first resilient means in said casing on one side of said pin to act as a shock absorber in one direction and a second resilient means in said casing on the opposite side of said pin to act as a shock absorber in the opposite direction, handle means attached to said pin for withdrawing said pin against the force of said yieldable means from said latched position to an unlatched position in which said pin is withdrawn from said slot and said hole to a position outside of said draw bar so that said draw bar is free to be moved between retracted and extended positions and outwardly beyond said extended position to further extended positions, when said handle means is released said yieldable means urging said pin against said draw bar so that when said draw bar is moved to align said hole with said pin said pin automatically latches said draw bar, means attached to said casing for swingably mounting said casing from a vehicle for movement in a substantially horizontal plane so that said draw bar can be swung therewith in a substantially horizontal arc, a substantially horizontal plate supported beneath said casing adjacent one end thereof, said plate being provided with at least one aperture therethrough, at least one locking pin, means supporting said locking pin from said casing for vertical movement between a locked position and an unlocked position, when in said locked position said locking pin removably extending into said aperture to lock said casing against swinging movement relative to said plate, when in said unlocked position said locking pin being withdrawn from said aperture so that said casing and said draw bar are free to swing horizontally, elastic means attached to said locking pin to urge said locking pin towards said locked position, grip means attached to said locking pin for withdrawing said locking pin against the force of said elastic means from said locked position to said unlocked position, when said grip means is released said elastic means urging said locking pin against said plate so that when said casing and said draw bar are swung to align said locking pin with said aperture said locking pin automatically locks said casing and said draw bar against swinging movement.

4. A trailer hitch for vehicles comprising a casing provided with openings adjacent opposite ends thereof, a draw bar slidably extending through said casing and projecting outwardly in opposite directions through said openings, said draw bar being provided with at least one hole therein, said casing being provided with at least one elongated slot therethrough, a pin, yieldable means urging said pin towards a latched position relative to said draw bar, when in said latched position said pin removably extending through said slot and through said hole to latch said draw bar, when said pin extends through said hole said draw bar being held in an extended position, carrier means supporting said pin from said casing for movement of said pin lengthwise in said slot and for movement of said pin substantially perpendicular to said draw bar, a first resilient means in said casing on one side of said pin to act as a shock absorber in one direction and a second resilient means in said casing on the opposite side of said pin to act as a shock absorber in the opposite direction, handle means attached to said pin for withdrawing said pin against the force of said yieldable means from said latched position to an unlatched position in which said pin is withdrawn from said hole to a position outside of said draw bar so that said draw bar is free to be moved between retracted and extended positions and outwardly beyond said extended position to further extended positions, when said handle means is released said yieldable means urging said pin against said draw bar so that when said draw bar is moved to align said hole with said pin said pin automatically latches said draw bar.

5. A trailer hitch for vehicles comprising a casing provided with aligned openings adjacent the opposite ends thereof, a draw bar slidably extending through said casing and projecting outwardly in opposite directions through said openings, said draw bar having a pair of spaced holes intermediate the ends thereof, said casing being provided with an elongated slot therethrough, a pin, yieldable means urging said pin towards a latched position relative to said draw bar, when in said latched position said pin removably extending through said slot and through at least one of said holes to latch said draw bar, when said pin extends through one of said holes said draw bar being held in a retracted position and when said pin extends through the other of said holes said draw bar being held in an extended position, carrier means supporting said pin from said casing for movement of said pin lengthwise in said slot and for movement of said pin substantially perpendicular to said draw bar, a first resilient means in said casing on one side of said pin to act as a shock absorber in one direction and a second resilient means in said casing on the opposite side of said pin to act as a shock absorber in the opposite direction, handle means attached to said pin for withdrawing said pin against the force of said yieldable means from said latched position to an unlatched position in which said pin is withdrawn from said holes to a position outside of said draw bar so that said draw bar is free to be moved between said retracted and extended positions and outwardly beyond said extended position to further extended positions, when said handle means is released said yieldable means urging said pin against said draw bar so that when said draw bar is moved to align one of said holes with said pin said pin automatically latches said draw bar, means attached to said casing for swingably mounting said casing from a vehicle for movement in a substantially horizontal plane so that said draw bar can be swung therewith in a substantially horizontal arc, a substantially horizontal plate supported beneath said casing adjacent one end thereof, said plate being provided with at least one aperture therethrough, at least one locking pin, means supporting said locking pin from said casing for vertical movement between a locked position and an unlocked position, when in said locked position said locking pin removably extending into said aperture to lock said casing against swinging movement relative to said plate, when in said unlocked position said locking pin being withdrawn from said aperture so that said casing and said draw bar are free to swing horizontally, elastic means attached to said locking pin to urge said locking pin toward said locked position, grip means attached to said locking pin for withdrawing said locking pin against the force of said elastic means from said locked position to said unlocked position, when said grip means is released said elastic means urging said locking pin against said plate so that when said casing and said draw bar are swung to align said locking pin with said aperture said locking pin automatically locks said casing and said draw bar against swinging movement.

6. A trailer hitch for vehicles comprising a casing, a draw bar slidably supported in said casing, said draw bar being provided with at least one hole therein, a pin, yieldable means urging said pin towards a latched position relative to said draw bar, when in said latched position said pin removably extending through said hole to latch said draw bar, when said pin extends through said hole said draw bar being held in an extended position relative to said casing, means movably supporting said pin from said casing for movement of said pin lengthwise of said casing, a first resilient means in said casing on one side of said pin to act as a shock absorber in one direction and a second resilient means in said casing on the opposite side of said pin to act as a shock absorber in the opposite direction, means operably coupled to said pin for withdrawing said pin against the force of said yieldable means from said latched position to an unlatched position in which said pin is withdrawn from said hole to a position outside of said draw bar so that said draw bar is free to be moved between retracted and extended positions and outwardly beyond said extended position to further extended positions, when said means operably coupled to said pin is released said yieldable means urging said pin against said draw bar so that when said draw bar is moved to align said hole with said pin said pin automatically latches said draw bar.

7. A trailer hitch for vehicles comprising a casing, a draw bar slidably supported in said casing, said draw bar being provided with at least one hole therein, a pin, yieldable means urging said pin towards a latched position relative to said draw bar, when in said latched position said pin removably extending through said hole to latch said draw bar, when said pin extends through said hole said draw bar being held in an extended position, means movably supporting said pin from said casing for movement of said pin lengthwise of said casing, a first resilient means in said casing on one side of said pin to act as a shock absorber in one direction and a second resilient means in said casing on the opposite side of said pin to act as a shock absorber in the opposite direction, a head attached to said pin and projecting outwardly therefrom, a lever adapted to engage said head, said lever being pivotally attached to said casing for pivoting movement between raised and lowered positions, when in said raised position said lever engaging said head to lift said head and withdraw said pin against the force of said yieldable means from said latched position to an unlatched position in which said pin is withdrawn from said hole to a position outside of said draw bar so that said draw bar is free to be moved between retracted and extended positions and outwardly beyond said extended positions, when said lever is released said yieldable means urging said pin against said draw bar so that when said draw bar is moved to align said hole with said pin said pin automatically latches said draw bar.

8. A trailer hitch for vehicles comprising a casing including opposite ends, a draw bar slidably supported in said casing, said draw bar being provided with at least one hole therein, a pin, yieldable means urging said pin towards a latched position relative to said draw bar, when in said latched position said pin removably extending into said hole to latch said draw bar, when said pin extends into said hole said draw bar being held in an extended position, carrier means slidably mounted in said casing and movably supporting said pin for movement with said carrier means longitudinally of said casing and for movement of said pin in a direction substantially perpendicular to said longitudinal movement, a first resilient means in said casing extending between one of said ends of said casing and one side of said carrier means to act as a shock absorber in one direction and a second resilient means in said casing extending between the other of said ends of said casing and the other side of said carrier means to act as a shock absorber in the opposite direction, a head attached to said pin and projecting outwardly therefrom, a lever adapted to engage said head, said lever being pivotally attached to said casing for pivoting movement between raised and lowered positions, when in said raised position said lever engaging said head to lift said head and withdraw said pin against the force of said yieldable means from said latched position to an unlatched position in which said pin is withdrawn from said hole to a position outside of said draw bar so that said draw bar is free to be moved between retracted and extended positions and outwardly beyond said extended position to further extended positions, when said lever is released said yieldable means urging said pin against said draw bar so that when said draw bar is moved to align said hole with said pin said pin automatically latches said draw bar.

9. A trailer hitch for vehicles comprising a casing, a draw bar slidably supported in said casing, said draw bar being provided with at least one hole therein, a pin, yieldable means urging said pin towards a latched position relative to said draw bar, when in said latched position said pin removably extending through said hole to latch said draw bar, when said pin extends through said hole said draw bar being held in an extended position relative to said casing, means movably supporting said pin relative to said casing for movement of said pin lengthwise of said casing, said last-mentioned means including a portion in said casing, a first resilient means in said casing on one side of said portion to act as a shock absorber in one direction and a second resilient means in said casing on the opposite side of said portion to act as a shock absorber in the opposite direction, means operably coupled to said pin for withdrawing said pin against the force of said yieldable means from said latched position to an unlatched position in which said pin is withdrawn from said hole to a position outside of said draw bar so that said draw bar is free to be moved between retracted and extended positions and outwardly beyond said extended position to further extended positions, when said means operably coupled to said pin is released said yieldable means urging said pin against said draw bar so that when said draw bar is moved to align said hole with said pin said pin automatically latches said draw bar.

References Cited in the file of this patent
UNITED STATES PATENTS

| | | |
|---|---|---|
| 1,304,261 | Cadman | May 20, 1919 |
| 1,422,189 | Eckertz | July 11, 1922 |
| 1,491,637 | Schrum | Apr. 22, 1924 |
| 1,838,499 | Robinson | Dec. 29, 1931 |
| 2,988,383 | Carson | June 13, 1961 |